Figure 1:
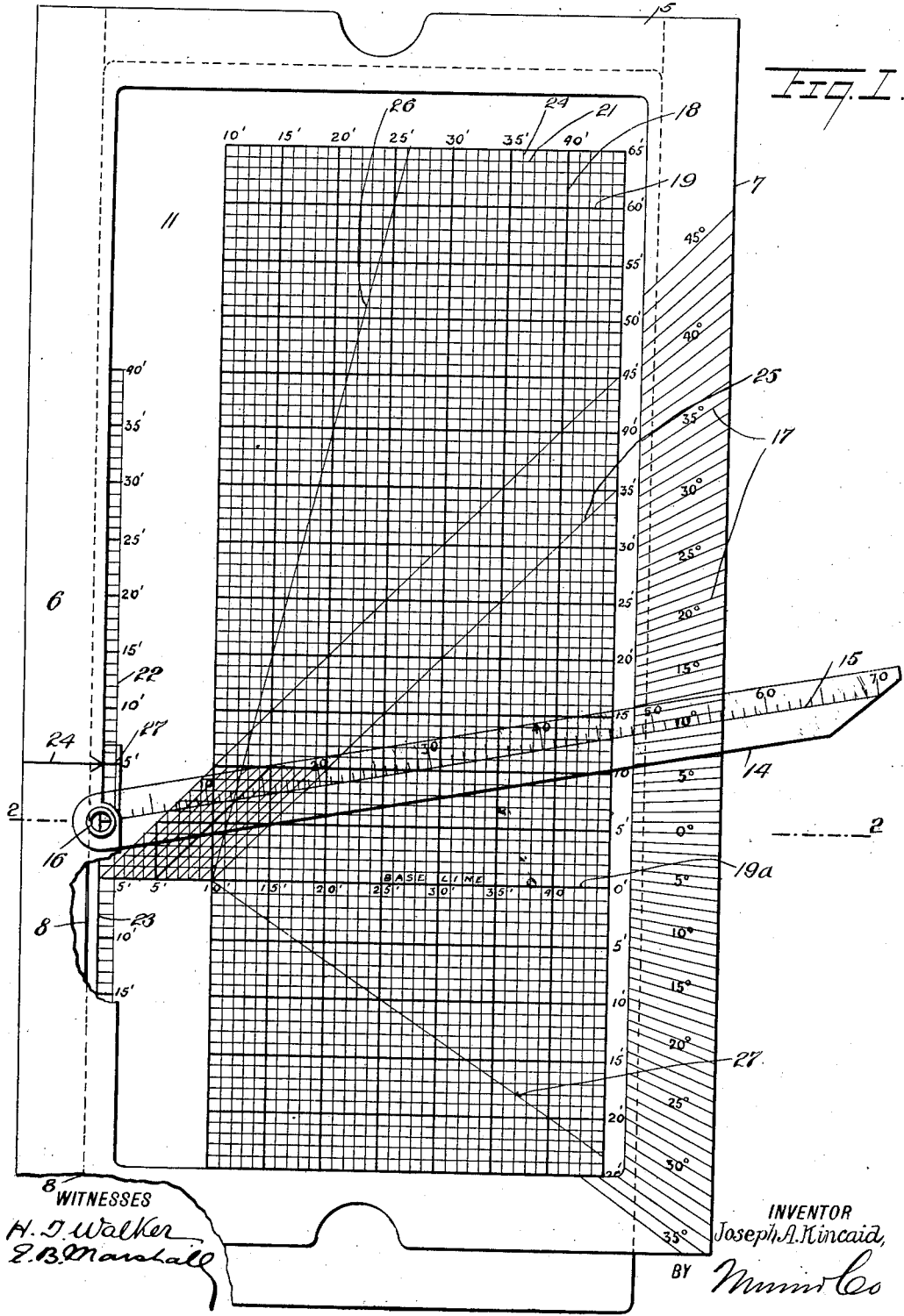

J. A. KINCAID.
MEASURING SCALE.
APPLICATION FILED OCT. 16, 1912.

1,074,439.

Patented Sept. 30, 1913.
2 SHEETS—SHEET 1.

WITNESSES
H. J. Walker
E. B. Marshall

INVENTOR
Joseph A. Kincaid,
BY Munn & Co
ATTORNEYS

J. A. KINCAID.
MEASURING SCALE.
APPLICATION FILED OCT. 16, 1912.
1,074,439.
Patented Sept. 30, 1913.
2 SHEETS—SHEET 2.
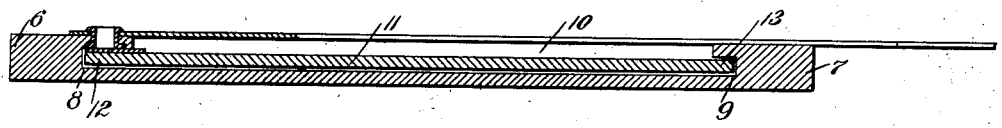
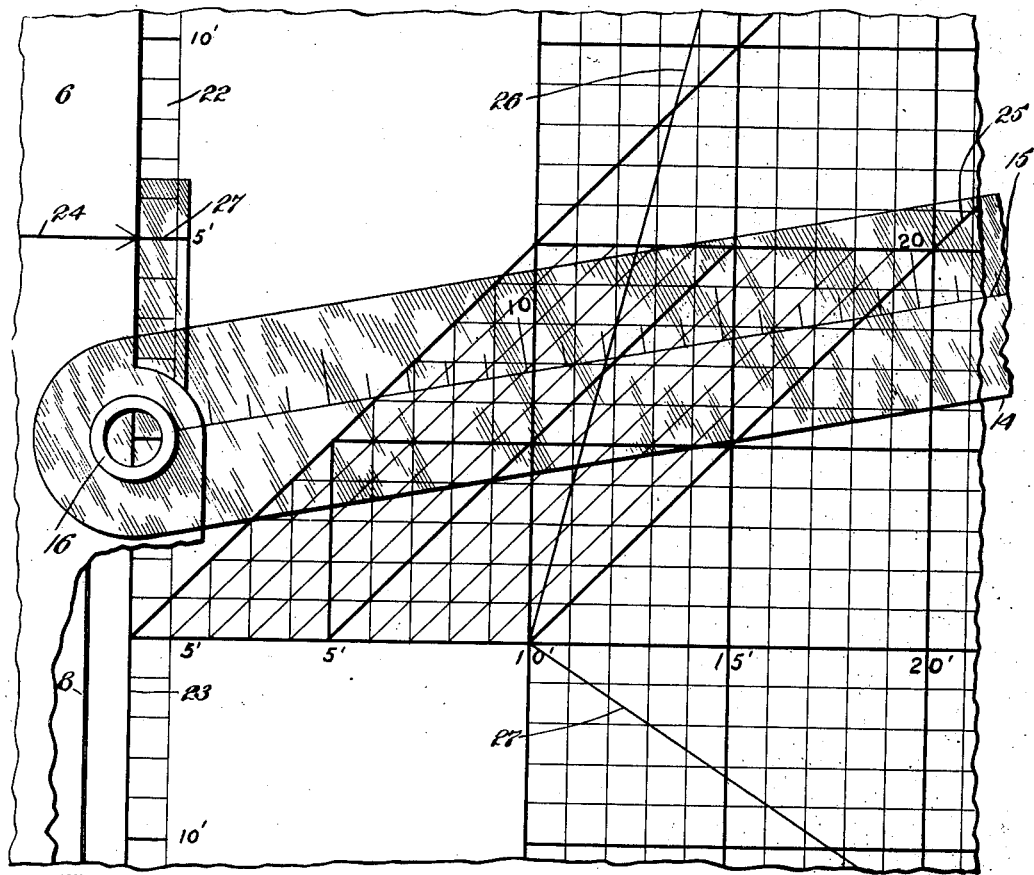
WITNESSES
H. J. Walker
E. B. Marshall
INVENTOR
Joseph A. Kincaid
BY Munn & Co
ATTORNEYS

UNITED STATES PATENT OFFICE.

JOSEPH ALBERT KINCAID, OF SANTA BARBARA, CALIFORNIA.

MEASURING-SCALE.

1,074,439.  Specification of Letters Patent.  Patented Sept. 30, 1913.

Application filed October 16, 1912. Serial No. 726,052.

*To all whom it may concern:*

Be it known that I, JOSEPH A. KINCAID, a citizen of the United States, and a resident of Santa Barbara, in the county of Santa Barbara and State of California, have invented a new and Improved Measuring-Scale, of which the following is a full, clear, and exact description.

My invention has for its object to provide a measuring scale, with which the markings on cross section stakes in excavating and embankment work may be readily determined.

Additional objects of the invention will appear in the following complete specification, in which the preferred form of the invention is disclosed.

In the drawings similar characters of reference indicate corresponding parts in all the views, in which—

Figure 1 is a plan view of the device; Fig. 2 is a sectional view on the line 2—2 of Fig. 1; and Fig. 3 is an enlarged fragmentary view, showing the principal portions of the device.

In determining markings on cross section stakes in making excavations, and also in making embankments, it is necessary to consider not only the finished grade, but also the natural grade or the lay of the land, for when in a certain place the finished grade is to be five feet higher than a predetermined level, and the natural grade is two feet lower than the said predetermined level, it will be seen that the fill in the said place must be seven feet, and the cross section stake should show this marking. Various means are now being used to determine markings on cross section stakes, which are to be used in this manner, but they are not convenient, and the results obtained by their use are not always certain when they are not determined by skilled engineers. With my scale the places at which the cross section stakes are to be marked may be accurately and readily determined by the workmen employed by the engineer on the job.

By referring to the drawings it will be seen that a frame member 5 is provided having sides 6 and 7, in which there are guideways 8 and 9, which open into the central portion 10 of the frame member 5, between the sides 6 and 7. This construction is provided so that a member 11 may be disposed with its sides 12 and 13 in the guideways 8 and 9, so that the member 11 may slide relatively to the member 5, and be prevented from moving out of position laterally. To the side 6 there is pivoted an arm 14, which is preferably constructed of transparent material, and which has marked thereon a scale 15. This arm 14 is preferably pivoted to the sides 6 of the member 5, by an eye member 16, to expose the card or member 11 below the axis of the arm 14. On the upper face of the side 7, there are markings 17, which indicate the degrees of a circle having for its center the axis of the arm 14. The card or member 11 may be constructed of cardboard or rough celluloid, on which lines may be drawn, and readily erased, and this card or member 11 is divided into squares by the vertical lines 18, and the horizontal lines 19, and these squares formed by the lines 18 and 19 are divided by the vertical lines 20, and the horizontal lines 21, to indicate distances or measurements. Across this card or member 11 there is a horizontal line 19$^a$, which is referred to as the base line, the card or member 11 being normally disposed in a position where this base line 19$^a$ is in alinement with the axis of the arm 14. On the card or member 11 there is a vertical scale 22, the line 23 of which passes through the axis of the arm 14. This scale 22 is provided for adjusting the card or member 11 relatively to the frame member 5 and the side 6 of the frame member 5 is provided with a mark or arrow 24, to be used in connection with the scale 22, for determining the position of the card or member 11 relatively to the frame member 5. A line 25 may be drawn on the card or member 11 for indicating the desired slope of the excavation which is to be made. This line 25, as shown in the drawings, is in on a one to one slope, and is disposed at an angle of forty-five degrees (45°) relatively to the base line 19$^a$, but of course a line may be drawn on the card or member 11, which will indicate any desired slope for the excavation, as, for instance, the line 26, which indicates a slope of one-quarter to one.

In using the device, for finding the proper position for marking the slope on cross section stakes, I proceed by first ascertaining the cut in the center line, and should it be five feet, the card or member 11 is slid down in the guideways 8 and 9, and relatively to the frame member 5, until the mark five feet shown at 27 on the scale is in alinement with the fixed mark or arrow 24, on the frame member 5. The natural slope of the surface of the ground is then determined, and should this be ten degrees the scale arm 14 is set at an angle of ten degrees on the markings 17, as shown in the drawings. The point of the intersection of the line 25, and the scale line 15 on the movable arm, shows the position of the slope of the cross section stakes, and the horizontal distance out from the center line of the roll is found to be 18.2 feet on the base line 19$^a$, the slope distance is found to be on the scale line 15 of the arm 14, to be 18.5 feet, and this distance is used to set the stake, and with the knowledge of this distance the position of the stake may be determined without difficulty. Should the slope of the natural lay of the ground change at twelve feet out from the center measured on the slope from ten to five degrees, I proceed as follows; at that point, 12 feet out, the cut is found to be 7 feet, and the horizontal distance is found to be 11.7 feet. The cut to the line 25 or slope of excavation is found to be 5.2 feet, and this being so, the card or member 11 is set at 5.2 feet, by moving the card or member 11 down, so that the scale 22 at the point 5.2 feet will be opposite the fixed marking or arrow 24 on the frame 25. When this has been done the arm 14 is moved so that the scale line 15 coincides with the 5° marking on the side 7 of the frame member 5, and the distance is found to be 5.8 feet, which, added to the 11.7 feet, makes a total distance out from the side of the road to be 17.5 feet; the cut is therefore 5.7 feet, from which the 5.2 is subtracted, leaving 5 feet, which is added to the 7 feet, which makes a total of 7.5 feet. The line 30 is used on a slope of one and one-half to one, to be used in embankments; and the operation is the same. The rule to be used in using the scale is the same, whether the work to be done is the making of an embankment or the excavation.

Having thus described my invention, I claim as new, and desire to secure by Letters Patent:—

1. In a measuring scale, a member having two sides spaced apart, an arm with a scale pivoted to one of the sides of the member, there being markings on the other side of the member indicating the degrees of a circle the center of which is the axis of the arm, a second member disposed between and substantially filling the space between the said sides of the first member, the second member being adapted for movement longitudinally of the sides of the first member, and having a scale extending substantially parallel with the sides of the first member and adjacent the side of the first member, having the arm, there being vertical and horizontal lines on the face of the second member dividing the face into squares.

2. In a measuring scale, a member having two sides spaced apart, an arm with a scale, the arm being pivoted to the side of the member with an eye for exhibiting the intersection of the plane of the scale with a scale on a second member, there being markings on the other side of the first member indicating the degrees of a circle the center of which is the axis of the arm, the second member having a surface on which lines may be made and erased, the said surface of the second member being disposed between and substantially filling the space between the sides of the first member, the second member being adapted for movement longitudinally of the sides of the first member, there being vertical and horizontal lines on the said surface of the second member, dividing the surface into squares, markings on the lines indicating distances for the purpose specified, and a scale on the second member extending substantially parallel with the sides of the first member, which is exhibited through the eye member.

In testimony whereof I have signed my name to this specification in the presence of two subscribing witnesses.

JOSEPH ALBERT KINCAID.

Witnesses:
F. F. FLOURNOY,
A. G. HOLLISTER.